United States Patent
Matthews et al.

(10) Patent No.: US 6,592,919 B1
(45) Date of Patent: Jul. 15, 2003

(54) CARBON DIOXIDE ATMOSPHERE MODIFIERS FOR PACKAGING

(75) Inventors: Andrew Ernest Matthews, Greer, SC (US); Thomas Erick Snowball, Bonogin (AU); Rod Darnett, Banora Waters (AU)

(73) Assignee: Sealed Air (NZ) Limited, Hamilton (NZ)

(*) Notice: Subject to any disclaimer, the term of this patent is extended or adjusted under 35 U.S.C. 154(b) by 0 days.

(21) Appl. No.: 09/719,020

(22) PCT Filed: Jun. 1, 1999

(86) PCT No.: PCT/NZ99/00068
§ 371 (c)(1),
(2), (4) Date: Apr. 9, 2001

(87) PCT Pub. No.: WO99/62790
PCT Pub. Date: Dec. 9, 1999

(30) Foreign Application Priority Data

Jun. 8, 1998 (NZ) ................................. 330589

(51) Int. Cl.⁷ .................. B65D 81/20; B65D 81/26; A23L 3/3418; A23L 3/3427
(52) U.S. Cl. .................. 426/124; 426/316; 426/398; 426/418
(58) Field of Search .................. 426/124, 106, 426/316, 323, 324, 418, 398; 99/467

(56) References Cited

U.S. PATENT DOCUMENTS 4,485,133 A * 11/1984 Ohtsuka et al. ........ 426/124 X
4,748,904 A * 6/1988 Razeto et al. ................. 99/467
5,686,126 A   11/1997 Noel et al. ................... 426/127
5,919,547 A    7/1999 Kocher et al. ............... 428/138
6,165,381 A * 12/2000 Usui ..................... 426/124 X

FOREIGN PATENT DOCUMENTS

| AU | 701618 | 2/1997 |
|----|--------|--------|
| EP | 0 128 795 B1 | 3/1988 |
| EP | 0 468 880 A1 | 7/1991 |
| FR | 2 621 015 | 9/1987 |
| JP | 57-125683 | 7/1982 |
| WO | 94/10233 | 5/1994 |
| WO | 94/26621 | 11/1994 |
| WO | 96/08424 | 3/1996 |

* cited by examiner

Primary Examiner—Reginald L. Alexander
(74) Attorney, Agent, or Firm—Rupert B. Hurley, Jr.

(57) ABSTRACT

A device or sachet (3) for maintaining or modifying the atmosphere in a package suitable for meat, beef, lamb, pork, etc. the device including at least two containing layers (4, 5), a moisture activated chemical substance (6) contained by the containing layers, and at least one absorbent layer (7). Moisture within the package is soaked up by the absorbing layer. The moisture is then transferred from the absorbing layer to permeate through a micro-porous layer (5) as water vapor and activate the chemicals. The gas produced by the chemicals then passes through the sachet and into the package's atmosphere. This modifies the atmosphere to ensure that there is an adequate quantity of $CO_2$ for achieving the desired shelf life of the packaged food.

11 Claims, 1 Drawing Sheet

CARBON DIOXIDE ATMOSPHERE MODIFIERS FOR PACKAGING

TECHNICAL FIELD

This invention relates to methods and apparatus used in packaging. More particularly, the principles of the present invention relate to the packaging of food products such as meat using atmosphere modifiers.

Reference to the packaging of meat should not be seen to be limited as the principles of the present invention may be equally applied to the packaging of other food products.

BACKGROUND ART

The export and domestic consumption of meat, such as beef, lamb, chicken and other meats, provides a significant source of revenue for many countries. It is therefore important that this product arrives at its destination having the highest possible quality. It therefore follows that packaging methods used to contain the meat in transit must be of high quality in order to keep the meat in a desired state.

There are however problems with the current methods and apparatus used to package meat.

A natural process that must be mitigated or avoided, is oxidation. This occurs by oxygen coming in contact with the meat during storage and transit, causing oxidation.

In general, consumers perceive that meat coloured red is fresh, and therefore preferable to discoloured meat. However, storage under conditions where oxygen is present results in gradual browning of the meat. While in many cases the product is still acceptable for consumption, consumers are deterred by the brownish appearance of the meat which they associate with a spoiled product.

In cases where long-term storage of meat is necessary, the presence of oxygen can result in spoilage of the meat in addition to the browning of the meat.

One method of avoiding oxygen spoilage, is vacuum packaging the meat in an oxygen impermeable barrier film. The problems associated with this are that the meat, under a low or nil oxygen modified atmosphere or a vacuum atmosphere, tends to develop a purple colouration which consumers find unacceptable.

High oxygen/$CO_2$ modified atmosphere systems are successfully used for retail cuts of red meat, but the storage life is relatively low due to loss of colour.

A well known packaging system known as low oxygen/$CO_2$ packaging is in current use however has been mainly directed to non-retail ready markets.

The shelf life of $CO_2$ packaged meat is longer than for vacuum packed meat. The meat stored under $CO_2$ will rebloom on exposure to oxygen, giving the red colouration which consumers associate with freshness.

The display life of $CO_2$ packaged meat, in the oxygenated state appears to be longer than that of vacuum packed meat. This may be attributed to the low oxygen concentration throughout the product lifetime.

The use of low oxygen/high $CO_2$ packaging is well known, as is the use of oxygen absorbing compositions with meat products.

$CO_2$ will be absorbed in significant quantities by the meat within the first 48 hours of exposure. This absorption causes the internal pressure of the package to be reduced, unless there is a sufficient excess of $CO_2$ to saturate the meat, and a suitable mechanism by which the volume of the package may contract.

Therefore if the meat is placed on a conventional sized tray, evacuated, gas flushed with $CO_2$ and then sealed under a barrier film, severe distortion will occur as the $CO_2$ is absorbed and the internal pressure of the system is reduced. This is because the volume of the rigid tray cannot contract in a controlled manner like that of a bag, and because insufficient $CO_2$ is present to compensate for that which is absorbed by the meat.

This effect may be reduced if a high package volume in relation to the volume of the product is achieved. However this is undesirable to consumers and results in excessive packaging and waste.

One solution to the above problems has been to provide a sachet of a substance that absorbs oxygen and releases $CO_2$ in response to humidity. The sachet may be placed between one gas permeable layer immediately surrounding the meat, and a second gas impermeable layer.

In some embodiments, the sachet is placed over a hole in the permeable layer. This allows activation by in-pack humidity. The holes also allows rapid equilibration of gases. This embodiment thus produces a modified atmosphere package whereby distortion, excess oxygen and their associated negative effects is reduced.

Although this process has been successful, there have been problems associated with it.

Due to a number of steps that must be undertaken to implement the system for packaging the meat, the packaging process is complicated and expensive. For example, the process must be made accurate enough so that the sachet containing the regulating chemicals is placed over the hole in the permeable layer. An absorbing layer must also be placed in the package between the meat and the bottom of the package in order to absorb the fluids that may exude from the meat. The supermarkets place a pricing or use by date label over the hole once the sachet is removed, to avoid leakage and prevent contamination.

Other methods of atmosphere modification are desiccant sachets, sulfur dioxide emitters and devices for liberating chlorine dioxide.

These, combined with oxygen absorbers, and combined oxygen absorber/$CO_2$ generators form part of the technology known as active packaging.

Sachets that contain a $CO_2$ liberating chemical substance may be used in active packaging. This sachet may be made from a micro-porous, non-permeable membrane that allows transfer of humidity, but does not allow the transfer of liquid through the membrane.

There is also a need to transfer humidity from the pack to the sachet in order to initiate the atmosphere regulating chemicals. European Patent EP0128795 describes oxygen or $CO_2$ generators housed in sub-compartments of packages. The chemicals react on contacting the drip from the meat. No microporous films are used.

French Patent 2 621 015, describes $CO_2$ releasing chemicals, which are distributed in a fibrous structure. The hydro-phobicity of the fibres prevents the chemicals from leaching into the food.

European Patent EP0 468 880 A1, describes oxygen absorbers and/or $CO_2$ generators housed in liquid impermeable vapour permeable packets. The packets have two compartments housing the reactive components linked by a weak seal. Rupture of the weak seal causes the two components to react, thus modifying the package atmosphere.

All of the above documents describe devices that suffer the problem of requiring moisture vapour to activate the compounds, wherein the vapour is not drawn around or local to the sachet to sufficiently activate the compounds in the sachet.

What is needed then is a system of modifying the atmosphere of a closed package, by a process that is uncomplicated and does not necessitate the steps previously used.

It is an object of the present invention to address the foregoing problems or at least to provide the public with a useful choice.

Further aspects and advantages of the present invention will become apparent from the ensuing description which is given by way of example only.

DISCLOSURE OF INVENTION

According to one aspect of the present invention there is provided a device for maintaining or modifying the atmosphere in a package, the device including:

at least two containing layers, a moisture activated chemical substance contained by the containing layers, and at least one absorbent layer attached to at least one of the containing layers.

The present invention also relates to a method of packaging characterised by the step of placing into a package a device as described immediately above.

The absorbent layer may be any device capable of retaining and/or absorbing and/or transferring liquid or humidity.

The absorbent layer may be any suitable material, but preferably of food-grade quality.

The absorbent layer may contain a cellulosic absorbent such as paper or wood pulp or viscose fibers, superabsorbent polymers and the like and is preferably heat sealed to the adjoining layer.

Preferably the absorbent layer is of a thickness and type to absorb all of the fluid released by the product.

A preferred feature of the present invention is to have the absorbent layer of sufficient type and thickness to absorb excess fluid from the product or pooling in the tray packaging.

The absorbent layer may be attached to the containing layers by many means and in one embodiment may be heat sealed to the containing layer.

Reference to packaging will now be made with reference to the packaging of meat in a plastic container. This should not be seen to be limiting, as the principles of the present invention may be applied to the packaging of other substances and containers of other types.

Preferably the plastic container will include a substantially rigid base with plastic films at the top. The base may also include ribbed portions.

Reference to a rigid base and plastic top should not be seen to be limiting the scope of the present invention's, manufacture or use, as other container configurations may be used without departing from the scope of the present invention.

These atmosphere modifying absorbent pads may be used in non-retail packs such as in vacuum packed meat primal cuts or alternatively in bulk gas flushed packages.

In preferred embodiments there are two containing layers. Preferably, one of the containing layers positioned next to the absorbing layer is formed from a micro-porous film. Micro-porous films have high moisture vapour transmission rates (MVTR'S) and are not permeable to liquid water. These high MVTR materials allow water vapour to rapidly activate the chemical contained between the layers, but do not allow the chemicals to leach out and contaminate the foodstuff Because of the nature of these films, it is preferable that the product does not come into contact with the micro-porous film as local dessication can occur. Therefore it is envisioned that in use the device is placed in the packaging with the product on top of the containing layer (external) which is not micro-porous.

Reference to the present invention may now be made by reference to a sachet. Reference to a sachet should not be seen to be limiting the scope of the present inventions manufacture or use.

In one example, one side of the sachet may be constructed from a PET laminate or similar heat resistance material, and the other side from the micro-porous film.

Thus, it can be seen that the preferred structure of the present invention has an absorbent layer positioned on the bottom of the package which is next to a micro-porous layer that transfers moisture vapor from the absorbent layer or the humid atmosphere of the package to chemicals contained by the micro-porous layer and the other containing layer. The non-micro-porous containing layer ensures that there is no local desiccation of the product on top of it and both the containing layers ensure that the chemicals do not come into contact with the product.

Preferably the absorbing layer is peripherally bonded to the other containing layer. In some embodiments the peripheral bonds are heat laminated bonds or formed by heat lamination.

In one embodiment one or more containing layers may have oxygen absorbing capabilities.

In one preferred embodiment, the chemicals in the present invention may be one or a combination of moisture activated chemicals that modify the atmosphere to the desired configuration.

Preferably, the quantity and configuration of the chemical will be chosen for the appropriate expected shelf life and storage length of the product packaged.

The chemical may be a system capable of evolving or removing $CO_2$ over a period of time. This should not be seen to be limiting however. For example, in other preferred embodiments the chemical may remove oxygen from or release oxygen to the environment of the package. Anti-microbial gases may also be released from the chemical.

The present invention has a number of advantages.

A number of humidity triggered atmosphere modifying devices are known and are used in food packaging. These include sachets which absorb oxygen, absorb oxygen and generate $CO_2$ and those which generate carbon-dioxide only. These chemicals must be kept separate from the food using a functional barrier. The present invention achieves this by the use of the micro-porous film which only allows transmission of all gases. For example, these may be water vapour, $CO_2$ gas, oxygen and so forth. This list should not be seen to be limiting.

The presence of the absorbing device in the present invention ensures that sufficient moisture vapor is transferred to activate the chemicals that control the modified atmosphere. This combination of absorbent layer and containing layers, one of which is micro-porous, addresses the problems associated with the prior art.

In many cases where the absorbing layer is not present, and the meat or foodstuff does not contain sufficient moisture, the moisture activated atmosphere modifying chemicals are not activated sufficiently to modify the atmosphere to the required specification. The present invention avoids this possibility by providing the absorbing layer that contains moisture that may be transmitted over a period of time thus activating the desired chemicals allowing the gases evolved to pass through the micro-porous film into the package.

It is preferable to have the chemicals activated slowly over a period of time to prevent over-inflation of the package and possible rupture of the seal.

The present invention also has the advantage of acting as a drip absorbent in the final package. Thus, there is not the problem of liquid forming on the bottom of a package and spilling on an undesired location when the package is opened. Thus, the present invention has the advantage that it may be used as a drip absorber as well as an atmosphere modifier.

Thus, one device can absorb excess fluid, modify the package atmosphere, and eliminate problems associated with prior art atmosphere modifiers.

In preferred embodiments, these atmosphere modifying devices may be used in a sheet form between layers of modified atmosphere packaged foodstuffs to ensure there is no concentration gradient of gas through the sample.

The present invention describes an absorbent pad which contains a fluid impermeable gas permeable section containing atmosphere modifying chemicals. These chemicals are formulated to either generate $CO_2$ or to generate $CO_2$ and absorb oxygen.

The structure may also be used to house other atmosphere modifying chemicals when the product produces liquids. The chemicals need to be physically separated from the product. The reaction of these chemicals is triggered by the humidity of the product. The present invention has the advantage of keeping the chemicals separate from the food thus preventing them from leaching out of the sachet.

The present invention may be particularly useful in modified atmosphere packages and in conjunction with evacuation/gas flushing.

Some examples of the present invention are described below.

EXAMPLE 1

An absorbent pad capable of generating carbon dioxide and absorbing oxygen was prepared with the following materials:

Layer 1 PET film adhesively laminated to high opacity filled PE film.
Layer 2 Microporous polypropylene film with Gurley Air permeability of 100 sec/100 cc.
Layer 3 Non woven fabric consisting of a mixture of viscose fibres and polypropylene fibres with a weight of 120g/m².

A fine particle size well mixed powder of the following composition by weight was prepared:

| | |
|---|---|
| Sodium bicarbonate | 472.28 |
| Fumaric acid | 280.2 |
| Sodium erythorbate | 67.33 |
| Ferrous sulphate | 39.6 |
| Calcium chloride | 130.7 |
| Fumed silica | 9.9 |

1.75 g of the formulation was placed in between layers 1 and 2 as described above to form a cell of dimensions 58×56 mm. A high speed filling machine of proprietary design was used.

The absorbent pads were sealed in a barrier pouch and held at chill temperatures where they were stable to premature reaction for many months.

The pads were used to prepare long shelf life packages of beef, lamb and pork.

In barrier trays of volume 800 cc was placed two attached cells as described above. The cells were placed so that the PET layer contacted the meat, and the absorbent layer contacted the bottom of the trays. 500 g of beef, pork or lamb was then placed in the trays, which were then gas flushed with a mixture of 80% carbon dioxide and 20% nitrogen. The initial oxygen concentration was less than 1000 ppm. The barrier lidding film used was a proprietary film produced by Cryovac Sealed Air Corporation, which can be delaminated at the point of sale to leave a highly oxygen permeable film attached to the tray, and is described in U.S. Ser. No. 08/764,405 filed 11 December as a CIP application of U.S. Pat. No. 5,6861,126 which is incorporated by reference herein.

After 10 weeks storage at −1° C. the film was delaminated leaving the oxygen permeable film adhered to the tray. The products still have an acceptable retail display life in the oxygenated state. The bacteria levels were very low. For beef the initial counts were 2.7 log cfu/cm² which decreased to 2 log cfu/cm² after ten weeks at −1° C. After retail display the total counts were 3.9 log cfu/cm² for samples stored for 1 day before display, while samples stored for 10 weeks before display had a total count of 6.4 log cfu/cm² after retail display.

The packs showed no deformation due to carbon dioxide absorption, nor excess pressure caused by the presence of excess gas. No drip was visible in any of the packages at any point in the experiment.

There was no leaching of the chemicals from within the pad.

In further tests the pads could be suspended in water at 40° C. for many days without leaching. Eventually the bond between the PET laminate and the microporous film would break due to the pressure of water which had entered the area containing the chemicals.

This experiment demonstrates the following:

These atmosphere modifying chemicals may be successfully used as part of a drip absorbent system.

The chemicals are retained within the pouch after extended storage periods.

The chemicals contribute to the drip absorbing function of the non woven fabric by means of vapour transfer.

EXAMPLE 2

An absorbent pad capable of generating carbon dioxide, but not of absorbing oxygen was constructed as follows:

| | |
|---|---|
| Sodium bicarbonate | 550 |
| Fumaric acid | 320 |
| Calcium chloride | 130 |
| Fumed silica | 10 |

The mixture was used to formulate a pad for packaging chicken portions.

EXAMPLE 3

A powder of the following formulation was prepared:

| | |
|---|---|
| Iron powder | 100 |
| Sodium chloride | 5 |
| Precipitated silica | 5 |

1 g of the powder was placed in between layers 1 and 2 in a structure identical to that described in example 1.

The absorbent pad was placed in the bottom of the tray as in example 1 and used to pack 500 g of beef. The tray was gas flushed with 100% nitrogen.

The scavenging sachet maintained an oxygen concentration of less than 100 ppm throughout the lifetime of the package.

EXAMPLE 4

An absorbent pad was prepared as in example 1 except that Layer 3 was substituted with a material containing the following components:
Super absorbent fibres
Viscose fibres
Polyethylene fibres The composite had a weight of 150g/m$^2$.

In a standard test using a 0.9% saline solution to compare the absorption capacities the composite fabric absorbed 3500 g/m$^2$ of fluid versus 1500 g/m$^2$ for the fabric described in Example 1. This material could therefore be used in applications where much higher levels of drip are produced. The activity in terms of gas absorption and release were very similar to that obtained in example 1.

EXAMPLE 5

Sulphur dioxide releasing absorbent pads may be prepared using the structure described in example 1.

PCT/AU93/00562 describes a range of applications and materials which may be used to release sulfur dioxide in a controlled and sustained manner. These sulfur dioxide emitting materials may be utilised in the present invention.

The pad has the dual function of absorbing fluids and releasing an antimicrobial gas, whilst effectively separating the chemicals from the product.

EXAMPLE 7

Oxygen releasing pads may be prepared by utilising sodium perborate or percarbonate and the like compounds and mixtures in the cavity between Layers 1 and 2 of the structure as described in Example 1.

BRIEF DESCRIPTION OF DRAWINGS

Further aspects of the present invention will become apparent from the following description which is given by way of example only and with reference to the accompanying drawings in which.

DETAILED DESCRIPTION OF THE DRAWINGS

Figure 1:
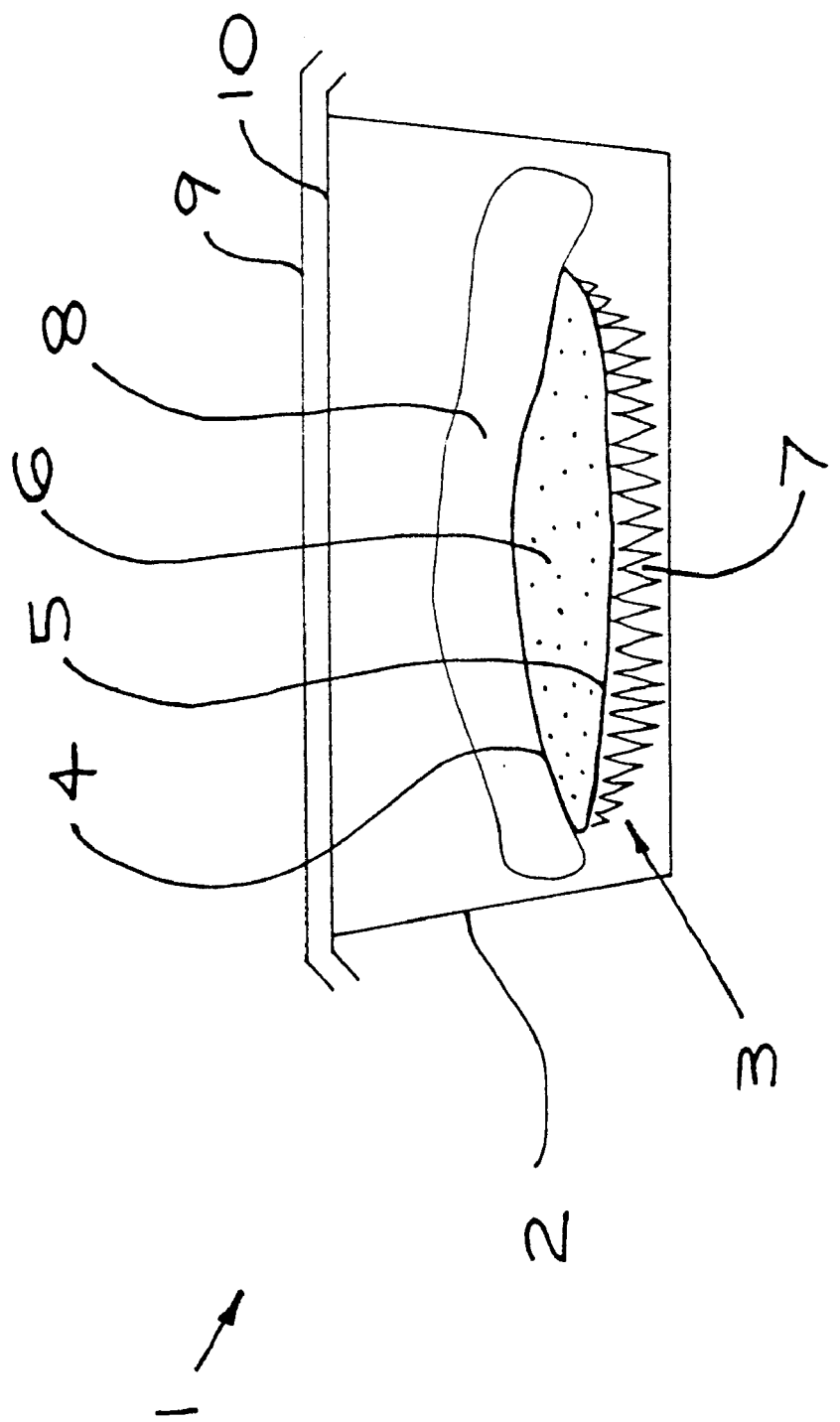
FIG. 1 shows a representation of one preferred embodiment.

According to FIG. 1 there is shown a package, shown by arrow 1.

Package 1 includes a container 2, a sachet 3.

The sachet 3 includes containing layers 4 and 5 which hold a chemical 6. Layer 5 is micro-porous in nature, allowing vapour to pass through it, but not allowing any liquid or solid material to pass through the layer.

The chemicals modify the atmosphere in the container. These may be a $CO_2$ emitting substance, or a combination of a $CO_2$ generating/oxygen absorber or absorber or any atmosphere modifier which needs to be effectively separated from the packaged product.

The sachet 3 also includes absorbing layer 7 which faces the base of the tray.

The product 8 within the package is meat.

The container 2, is sealed by two separate film layers 9 and 10. However, in alternative embodiments, a single plastic film may be used or a peelable laminate.

In use, the sachet 3, may be placed in the container 2 with the absorbing layer placed downwards, and the meat added.

The moisture within the package is soaked up by the absorbing layer 7. The moisture is then transferred from the absorbing layer 7 to permeate through the micro-porous layer 5 as water vapour and activate the chemicals 6. The gas produced by the chemicals 6 may then pass through the sachet 3 and into the package's atmosphere. This modifies the atmosphere to the desired requirements.

Thus, the required atmosphere is maintained, and the chemical mixture is activated without the chemicals contacting the product.

Aspects of the present invention have been described by way of example and it should be appreciated that modifications and additions may be made thereto without departing from the scope of the appended claims.

We claim:

1. A sachet for maintaining or modifying the atmosphere in a package, the sachet including:
   (A) a moisture vapor activated chemical substance contained by two containing layers bonded together, and
   (B) at least one moisture absorbent layer immediately adjacent to, and bonded to at least one of the containing layers wherein each said absorbent layer is external, relative to the said containing layers and wherein each containing layer positioned adjacent to an absorbent layer is formed from microporous film.

2. A device as claimed in claim 1 wherein one containing layer is not microporous.

3. A device as claimed in either claim 1 or claim 2 wherein one or more of the containing layers have oxygen absorbing capabilities.

4. A device as claimed in claim 1 or claim 2 wherein the device is capable of being used as a drip absorber.

5. A device according to claim 1 or claim 2 in which the moisture vapor activated chemical substance, when activated, modifies the gaseous atmosphere of the package.

6. A device according to claim 1 or claim 2 wherein the moisture vapor activated chemical substance, when activated, releases oxygen or carbon dioxide to, or removes oxygen or carbon dioxide from, the atmosphere within the package.

7. A device as claimed in claim 1 or claim 2 wherein the absorbing layer is peripherally bonded to the other containing layer.

8. A device as claimed in claim 7 wherein the peripheral bonds are heat laminated bonds or formed by heat lamination.

9. A method of packaging characterized by the step of including within a package a device as claimed in any one of claims 1 to 2.

10. A method of packaging as claimed in claim 9 characterized in that the absorbent layer of the device is placed downwards within the package such that it does not contact the product contained within the package.

11. A device as claimed in any one of claims 1 to 2, wherein the moisture absorbent layer comprises at least one member selected from paper, wood pulp, viscose fiber, and superabsorbent polymer.

* * * * *